(12) United States Patent
Ikai

(10) Patent No.: US 11,329,586 B1
(45) Date of Patent: May 10, 2022

(54) SEMICONDUCTOR DEVICE AND METHOD THEREFOR

(71) Applicant: SEMICONDUCTOR COMPONENTS INDUSTRIES, LLC, Phoenix, AZ (US)

(72) Inventor: Keita Ikai, Nerima-ku (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 27 days.

(21) Appl. No.: 17/083,754

(22) Filed: Oct. 29, 2020

(51) Int. Cl.
*H02P 23/14* (2006.01)

(52) U.S. Cl.
CPC .................... *H02P 23/14* (2013.01)

(58) Field of Classification Search
CPC ........................................ H02P 23/14
USPC ........................... 318/479, 478, 445
See application file for complete search history.

(56) References Cited

U.S. PATENT DOCUMENTS

| | | | |
|---|---|---|---|
| 6,196,650 B1 | 3/2001 | Inagaki | |
| 7,301,298 B2* | 11/2007 | Shao | H02P 6/182 |
| | | | 318/400.35 |
| 7,649,329 B2* | 1/2010 | Cheng | H02P 6/16 |
| | | | 318/400.05 |
| 8,378,606 B2* | 2/2013 | Brown | H02P 6/182 |
| | | | 318/599 |
| 2006/0152181 A1 | 7/2006 | Shao et al. | |
| 2008/0238349 A1 | 10/2008 | Cheng | |

FOREIGN PATENT DOCUMENTS

| EP | 0316077 A1 | 5/1989 |
|---|---|---|
| EP | 0892489 A1 | 1/1999 |

OTHER PUBLICATIONS

Geethu Zacharia, et al., "A Survey on Back EMF Sensing Methods for Sensorless Brushless DC Motor Drives," International Journal of Emerging Trends in Engineering Research, vol. 2, No. 2, Feb. 2014, 5 pages; available at http://warse.org/pdfs/2014/ijeter02222014.pdf.

Kenichi Iizuka, et al., "Microcomputer Control for Sensorless Brushless Motor," IEEE Transactions on Industry Appliations, Vo. IA-21, No. 4, May/Jun. 1985, pp. 595-601.

Infineon, "TLE9877QXA20—Microcontroller with LIN and BLDC MOSFET Driver for Automotive Applications," Data Sheet, Rev. 1.0, Mar. 3, 2017, 126 pages.

Jianwen Shao, et al., "A Novel Sensorless Brushless DC (BLDC) Motor Drive for Automotive Fuel Pumps," IEEE 0-7803-7492-04/02, 2002, pp. 53-59.

* cited by examiner

*Primary Examiner* — David Luo
(74) *Attorney, Agent, or Firm* — Robert F. Hightower

(57) ABSTRACT

In one embodiment, a motor control circuit may be configured as a current circuit that forms a sense current that is representative of at least a BEMF voltage from a motor, and to use the sense current to detect a substantially zero-crossing of the BEMF voltage.

20 Claims, 7 Drawing Sheets

SEMICONDUCTOR DEVICE AND METHOD THEREFOR

BACKGROUND

The present invention relates, in general, to electronics, and more particularly, to semiconductors, structures thereof, and methods of forming semiconductor devices.

In the past, various circuits and methods were used to control motors including brushless DC (BLDC) motors. The control circuits and methods sensed a back electro-motive force (BEMF) formed at the motor terminals and used these sensed signals to determine the proper timing for driving the motor. In some applications, the sensing circuit used a resistor divider to reduce the voltage received from the motor terminal in order to provide a signal level that could be used by the control circuit. The resistor dividers were used to form a virtual neutral voltage that was used a reference for sensing the BEMF. The resistors used in the resistor divider had to be very precisely matched in order to provide accurate timing of the sense signals. In some cases, the signals received from the voltage divider were very noisy and often had a lot of high-frequency noise. Therefore, some applications included a filter to filter the signal remove some of the noise. The resistor dividers usually were large and had a high power dissipation.

Other applications used clamp diodes to limit the maximum excursions of the sense signal in order to protect the circuit from the received sense signal. In some applications the clamped diodes could result in commutation errors. Also, because the signal was clamped, additional voltages or power supplies could be required in order to form the clamp voltage.

Both the resistor divider configuration and the diode configuration caused large current flow from the motor winding through these external components. This external current flow from the motor could cause voltage drops within the motor and could result in errors in detecting the BEMF.

Accordingly, it is desirable to have a motor control circuit that can sense the BEMF of the motor, that does not use resistor dividers to form a virtual neutral point, that does not use clamp diodes to clamp the value of the signal, or that does not cause large external current flow from the motor to the sensing elements.

Figure 1:
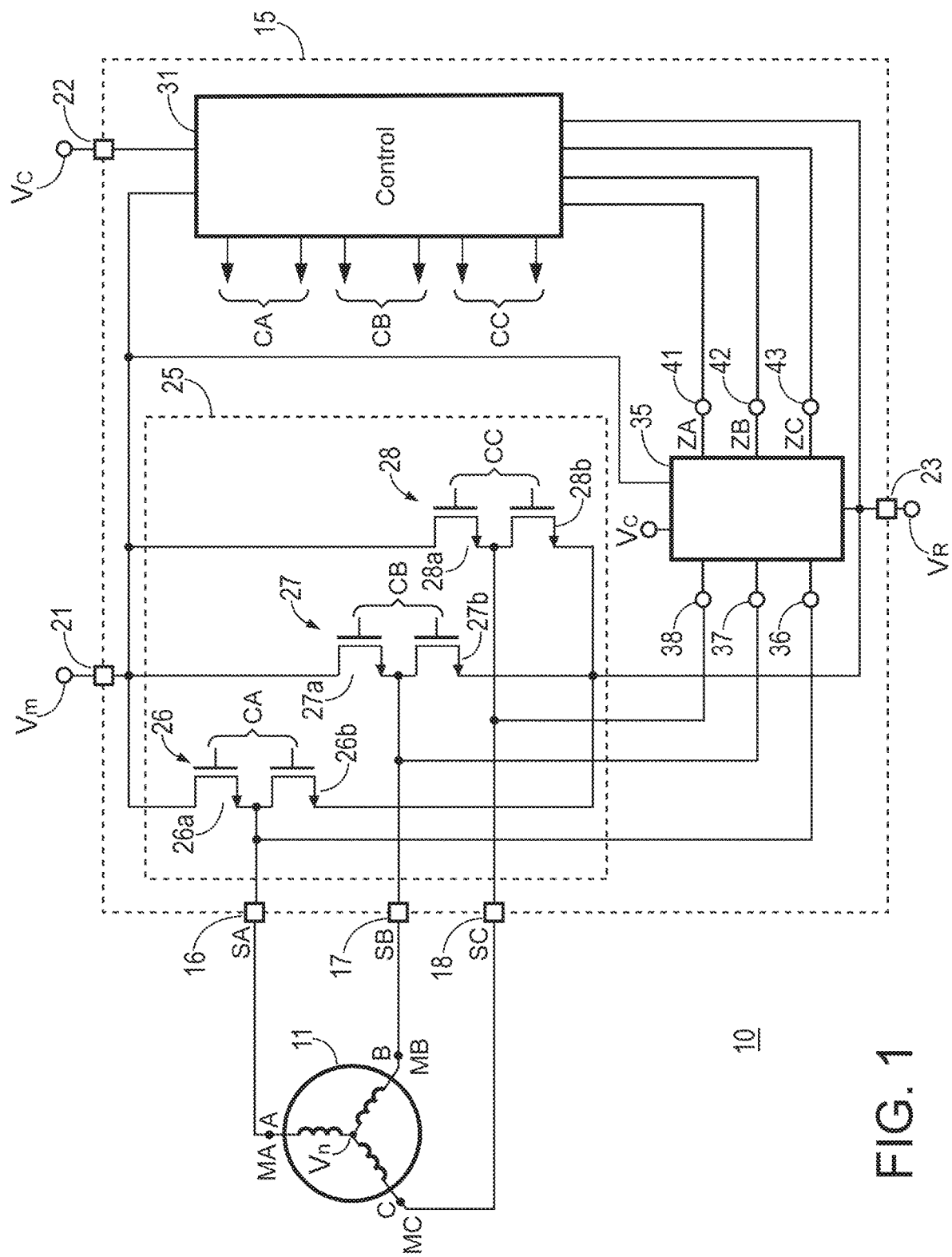
FIG. 1 schematically illustrates a block diagram example of an embodiment of a portion of a motor control system in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements may be omitted for simplicity of the description. As used herein current carrying element or current carrying electrode means an element of a device that carries current through the device such as a source or a drain of a transistor such as an MOS transistor or a high electron mobility transistor (HEMT), or an emitter or a collector of a bipolar transistor, or a cathode or anode of a diode, and a control element or control electrode means an element of the device that controls current through the device such as a gate of an MOS transistor, a gate of a HEMT, or a base of a bipolar transistor. Additionally, one current carrying element may carry current in one direction through a device, such as carry current entering the device, and a second current carrying element may carry current in an opposite direction through the device, such as carry current leaving the device. Although the devices may be explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for some elements including semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. Furthermore, the particular features, structures or characteristics may be combined in any suitable manner, as would be apparent to one of ordinary skill in the art, in one or more embodiments.

The embodiments illustrated and described hereinafter may have embodiments and/or may be practiced in the absence of any element which is not specifically disclosed herein.

DETAILED DESCRIPTION OF THE DRAWINGS

FIG. 1 schematically illustrates a block diagram example of an embodiment of a portion of a motor control system 10 that has more accurate motor control characteristics. System 10 includes a motor 11 and a motor control circuit 15. In an embodiment, motor 11 may be a three phase brushless DC (BLDC) motor. Motor 11 may have an embodiment that has three terminals designated as terminals MA-MC. Terminals MA, MB, and MC may be connected internally to one of the corresponding phases or windings of motor 11. In some embodiments, motor 11 may have more or fewer phases and terminals, and circuit 15 may have at least one input for each motor winding or alternately motor terminal.

Those skilled in the art will appreciate that during operation, motor 11 may form a BEMF voltage within motor 11, and may also form a neutral voltage Vn within motor 11. Motor 11 may have an embodiment that may form signals MA-MC on respective terminals MA-MC wherein the MA-MC signals can include the BEMF voltage. In an embodiment, the BEMF voltage may be offset by the neutral voltage Vn. Thus, the signal may include the BEMF voltage summed together with voltage Vn. In some embodiments, voltage Vn may have a value of substantially Vr or alternately may have a value of substantially Vm/2. The value of Vn and of the signals on MA-MC are all referenced to the value of a voltage Vr.

Circuit 15 receives operating power to operate the internal circuits between a voltage input terminal 22 and a voltage return terminal 23. Voltage input terminal 22 typically is connected to receive an operating voltage Vc, and terminal 23 may be connected to a common return voltage Vr. In some embodiments, the common return voltage Vr may be a ground voltage or alternately another type of common return voltage or alternately a negative voltage. An embodiment, may include that Vc may be approximately five volts (5V) or alternately less than five volts. For example, Vc may have a value of approximately three volts (or approximately three and one third volts [3.3V]) or less. An embodiment may include that voltage Vc may be approximately one and eight tenths of a volt (1.8V) or less.

Circuit 15 includes terminals 16, 17, and 18 that are configured for connecting to respective terminals MA, MB, and MC of motor 11. A drive circuit 25 of circuit 15 is configured to form drive signals SA, SB, and SC on respective terminals 16-18 to drive motor 11. The voltage value of signals SA-SC is measured relative to Vr. Circuit 15 may have an embodiment that also receives the MA-MC signals back from motor 11 on terminals 16, 17, and 18. Circuit 25 may include a set of H-bridge drivers that are used to form the drive signals to drive motor 11. The set of H-bridge drivers may include an H-bridge driver 26 that may be configured to drive terminal 16 and terminal MA of motor 11, an H-bridge driver 27 that may be configured to drive terminal 17 and terminal MB of motor 11, and an H-bridge driver 28 that may be configured to drive terminal 18 and terminal MC of motor 11. An embodiment of driver 26 includes N-MOS transistors 26a and 26b that are connected in the H-bridge configuration. The drain of transistor 26a is connected to receive a motor voltage Vm on an input 21 of circuit 15. Correspondingly, an embodiment of drivers 27 and 28 include corresponding N-MOS transistors 27a and 27b, and 28a and 28b, respectively. The drain of transistors 27a and 28a are connected to receive motor voltage Vm. In other embodiments, any of transistors 26a, 27a, or 27a may be P-MOS transistors instead of N-MOS transistors. The source of the P-MOS transistors may be connected to input 21. Motor voltage Vm may be a value greater than Vc in an embodiment. For example, voltage Vm may be no less than five volts (5V). An embodiment may include that voltage Vm may have a value of approximately twelve volts (12V) or alternately a value between twelve and forty eight volts (48V), inclusively.

A sense circuit 35 of circuit 15 is configured to receive the MA-MC signals from motor 11 and form control signals that indicate operational states of motor 11. Circuit 35 includes inputs 36, 37, and 38 that are connected to receive respective signals SA-SC or alternately respective signals MA-MC from motor 11. An embodiment may include that inputs 36-38 are connected directly to terminals 16-18, respectively. In an embodiment, inputs 36-38 may be configured for being connected to respective terminals MA-MC of motor 11. Circuit 35 also includes outputs 41, 42, and 43 that are configured to form control signals ZA, ZB, and ZC, respectively, that indicate different operational states or conditions of motor 11. For example, signals ZA-ZC may be formed to represent detection of a substantially zero-crossing of the BEMF within the respective motor winding. The zero-crossing of the BEMF can be used to determine the time at which to drive the motor windings. An embodiment may include that the zero-crossing of the BEMF may be represented by approximately the mid-point of the voltage received from the respective terminal of motor 11 or alternately a value of Vm/2.

A control circuit 31 of circuit 15 is configured to receive control signals ZA, ZB, and ZC, and form control signals CA, CB, and CC to control the operation of drivers 26-28.

An embodiment of circuit 35 may be configured to detect approximately the zero-crossing of the BEMF formed at any one of terminals MA-MC, and to responsively form corresponding signal ZA-ZC to signify detecting the zero-crossing of the BEMF. Circuit 35 may have an embodiment that may be configured to detect substantially the value of the signal received from any one of terminals MA-MC becoming approximately the mid-point voltage of the signal and to responsively form corresponding signal ZA-ZC to signify detecting the substantially zero-crossing of the BEMF or alternately substantially the mid-point value of the signal. An embodiment may include that circuit 35 includes a current mode circuit that forms a current that is representative of at least one of the BEMF voltages formed within motor 11, and to detect the current representing substantially the zero-crossing of the BEMF. For example, circuit 35 may be configured to form a transition of the value of corresponding signal ZA-ZC responsively to detecting approximately the zero-crossing of the corresponding BEMF within motor 11 or alternately the mid-point value of the respective MA-MC signal. An embodiment may include that approximately the mid-point of the received signal value may be approximately the sum of the BEMF voltage plus Vn or alternately approximately the sum of the BEMF voltage plus one-half of Vm.

Figure 2:
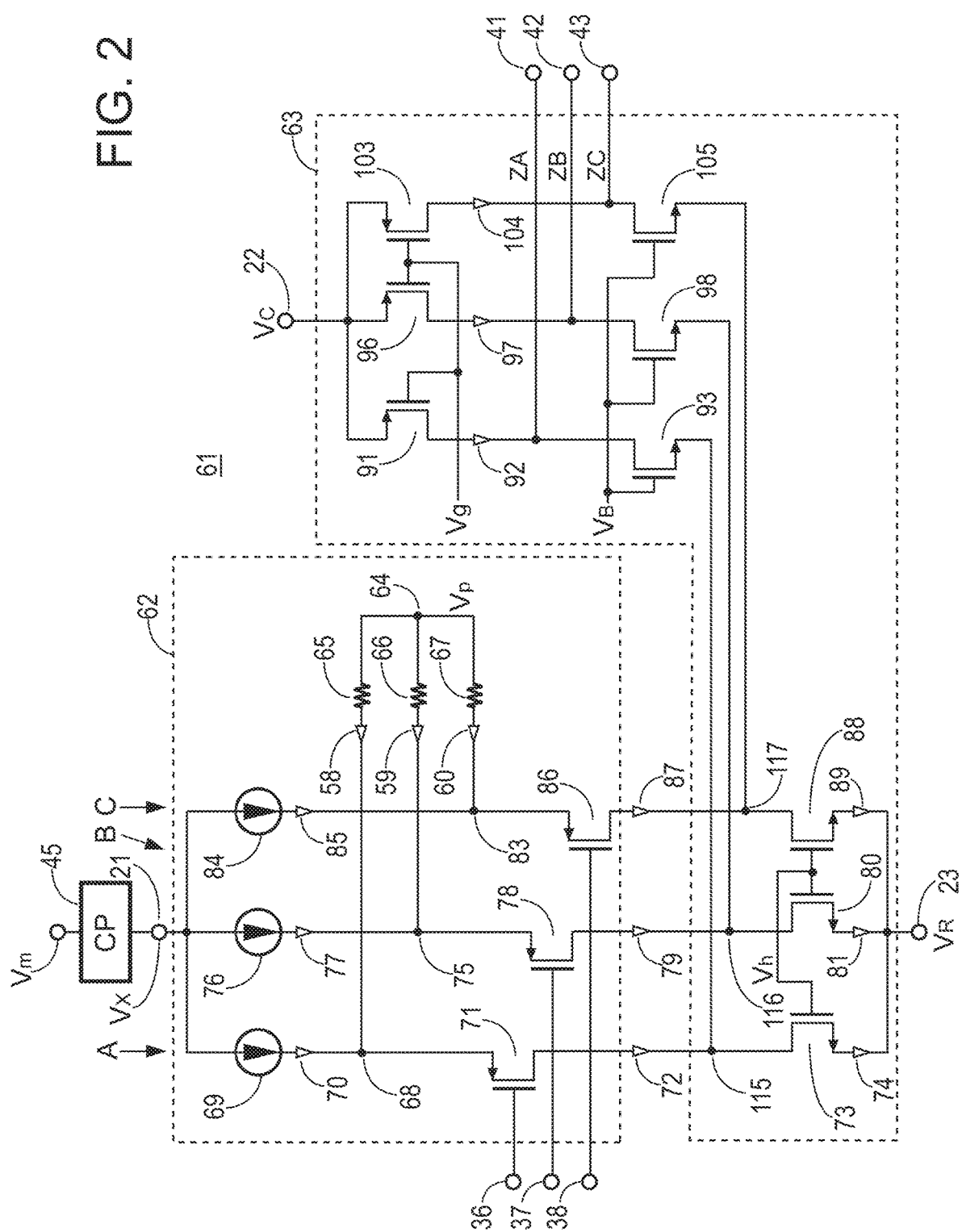
FIG. 2 schematically illustrates an example of a portion of an embodiment of a sense circuit that may have an embodiment that may be an alternate embodiment of at least a portion of the circuit of FIG. 1 in accordance with the present invention.

FIG. 2 schematically illustrates an example of a portion of an embodiment of a sense circuit 61 that may have an embodiment that may be an alternate embodiment of circuit 35 illustrated in FIG. 1. Circuit 61 includes an input stage or input circuit 62 that is configured to receive the SA-SC signals and/or the MA-MC signals from terminals MA-MC of motor 11, and also includes an output stage or output circuit 63 that is configured to form signals ZA-ZC. Circuit 61 may be configured to have one sense circuit for each phase of motor 11. Thus, an embodiment of circuit 61 includes sense circuits A-C for respective terminals MA-MC of motor 11. A portion of circuit A includes a current source 69, a resistor 65, and a transistor 71 of input circuit 62. Transistor 71 is configured to be connected to receive signals from terminal 16, or alternately signal MA from terminal MA of motor 11. A portion of circuit B includes a current source 76, a resistor 66, and a transistor 78. Transistor 78 is configured to receive signals from terminal 17, or alternately signal MB from terminal MB of motor 11. A portion of circuit C includes a current source 84, a resistor 67, and a transistor 86 that is configured to receive signals from terminal 18, or alternately signal MC from terminal MC of motor 11. A terminal of each resistors 65-67 is commonly connected together at a node 64. Current sources 69, 76, and 84 are connected to receive operating power from a voltage Vx. Voltage Vx is greater than the motor voltage Vm by at least the Vgs threshold voltage of any one of transistors 71, 78, and 86. The value of Vx allows transistors 71, 78, or 86 to be enabled when the corresponding input 36-38 is at approximately voltage Vm. An embodiment of voltage Vx may be five (5) or more volts greater than voltage Vm. Voltage Vx may be from approximately five volts to approximately twelve volts (12V), inclusively, greater than Vm. In an embodiment, a charge pump circuit 45 may be used to form a voltage that is added to voltage Vm in order to form voltage Vx. An embodiment may include that circuit 45 may be a portion of circuit 61. Other embodiments may use a separate power source to form voltage Vx. An embodiment of transistors 71, 78, and 86 may be configured to have substantially the same Vgs voltages. For example, the same Vgs under the condition of having the same gate, source, and drain voltages. An embodiment may include that transistors 71, 78, and 86 have a high breakdown voltage to withstand voltage Vx such as during the time that the transistor may be disabled.

Output stage 63 includes output circuits for each one of signals MA-MC and terminals MA-MC. A second portion of circuit A includes a current source transistor 91, a transistor 93, and a current source transistor 73. A second portion of circuit B includes a current source transistor 96, a transistor 98, and a current source transistor 80, and a second portion of circuit C includes a current source transistor 103, a transistor 105, and a current source transistor 88. Circuit 63, or alternately transistors 91, 96, and 103, are configured to receive operating power from input voltage Vc.

Figure 3:
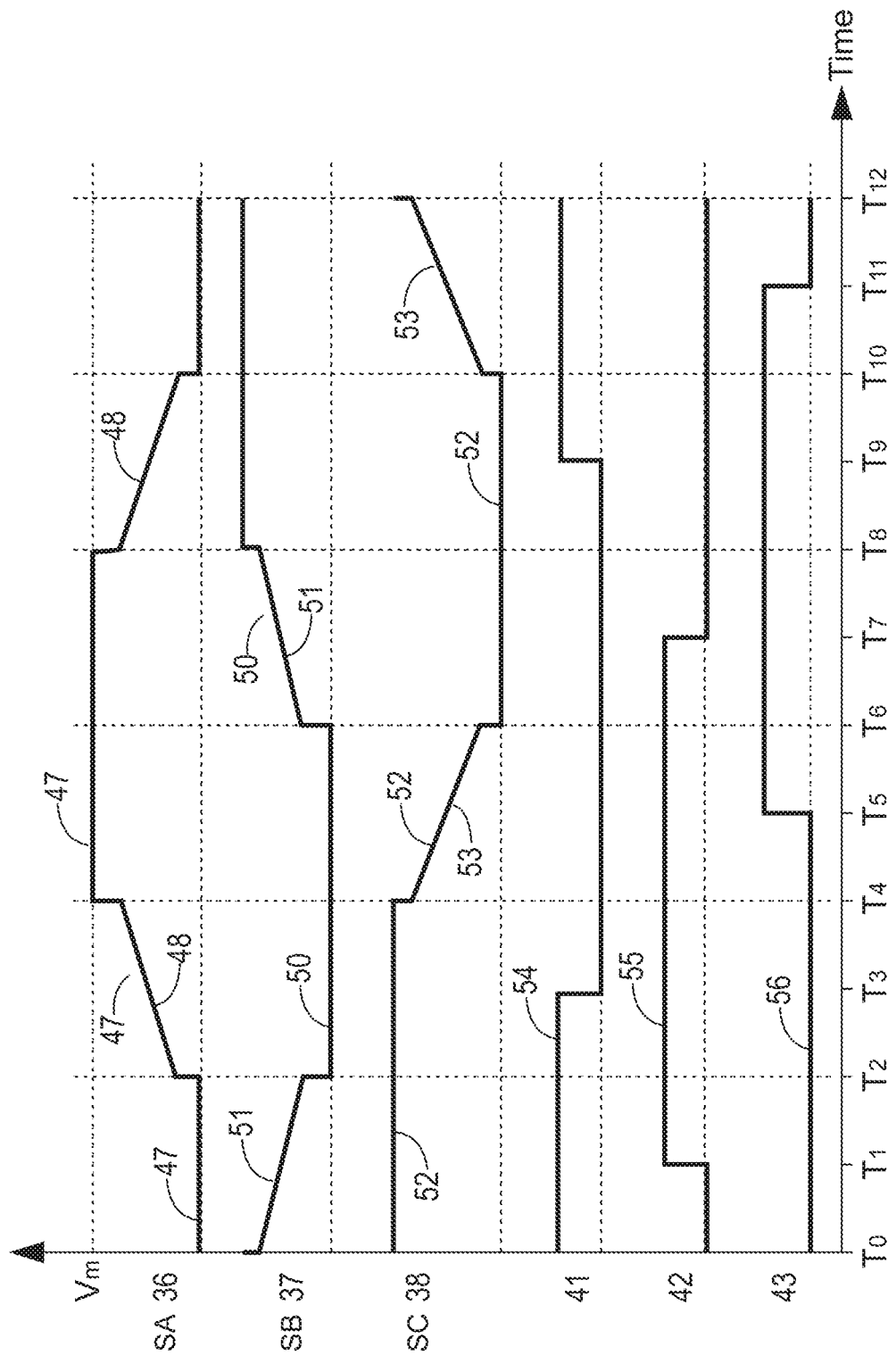
FIG. 3 is a graph having plots that illustrate some of the signals formed during the operation of an embodiment of the circuit of FIG. 1 or 2 in accordance with the present invention.

FIG. 3 is a graph having plots that illustrate an embodiment of some of the signals formed during a simplified example of an operation of an embodiment of circuit 15 or alternately circuit 61. The abscissa indicates time and the ordinate indicates increasing value of the illustrated signal. A plot 47 illustrates the SA signal on input 36, or alternately the MA signal from terminal MA. A plot 50 indicates the SB signal on input 37 or alternately the MB signal from terminal MB, and a plot 52 indicates the SC signal on input 38 or alternately the MC signal from terminal MC. A plot 54 illustrates output signal ZA, a plot 55 indicates output signal ZB, and a plot 56 indicates output signal ZC. This description has a references to FIGS. 1-3.

As will be seen further hereinafter, an embodiment of circuit A may be configured as a current mode circuit that detects substantially the zero-crossing of the BEMF voltage received from terminal MA. In an embodiment, circuit A may be a current circuit that is configured to form a first sense current that is representative of the signal on motor terminal MA (or alternately representative of the inverse of MA), and to detect substantially the first sense current representing substantially the zero-crossing of the BEMF received from signal MA. Circuit A may have an embodiment that may be configured as a current comparator that compares the first sense current, such as for example a current 72, with a reference current (such as for example the sum of a current 74 minus a current 92), and forms the value of output 41 and signal ZA in response to the first sense current becoming representative of substantially the zero-crossing of the corresponding BEMF voltage within motor 11 or alternately substantially the mid-point of the MA signal, or alternately becoming approximately the reference current. An embodiment of the current comparator circuit may include node 115, transistor 73 and transistor 91. An embodiment of circuit A may be configured as a current detector circuit.

An embodiment of circuit B may be configured as a current mode circuit that detects substantially the zero-crossing of the BEMF voltage received from terminal MB. In an embodiment, circuit B may be a current circuit that is configured to form a second sense current that is representative of the MB signal (or alternately representative of the inverse of MB), and to detect substantially the second sense current representing substantially the zero-crossing of the BEMF received from signal MB. Circuit B may have an embodiment that may be configured as a current comparator that compares the second sense current, such as for example current 79, with a reference current (such as for example the sum of a current 81 minus a current 97), and forms the value of output 42 and signal ZB in response to the second sense current becoming representative of substantially the zero-crossing of the corresponding BEMF voltage within motor 11 or alternately substantially the mid-point of the MB signal, or alternately becoming approximately the reference current. An embodiment of the current comparator circuit may include node 116, transistor 80 and transistor 91. An embodiment of circuit B may be configured as a current detector circuit. Similarly, circuit C may have an embodiment that may be configured as a current mode circuit that detects substantially the zero-crossing of the BEMF voltage received from terminal MC. In an embodiment, circuit C may be configured as a current circuit that is configured to form a third sense current that is representative of the MC signal (or alternately representative of the inverse of MC), and to detect substantially the third sense current representing substantially the zero-crossing of the BEMF received from signal MC. An embodiment of circuit C may be configured as a current comparator that compares the third sense current, such as for example current 87, with a reference current (such as for example the sum of a current 89 minus a current 104), and forms the value of output 43 and signal ZC in response to the third sense current becoming representative of substantially the zero-crossing of the corresponding BEMF voltage within motor 11 or alternately substantially the mid-point of the MC signal, or alternately becoming approximately the reference current. An embodiment of the current comparator circuit may include node 117, transistor 88 and transistor 103. An embodiment of circuit C may be configured as a current detector circuit.

An embodiment of circuit 61 may include that transistors 73, 80, 88, 91, 96, and 103 are designed so that the bias voltage Vh and Vg form gate-to-source voltages (Vgs) for each transistor that are greater than the Vgs threshold voltage for the transistors, and these transistors are also designed so that the drain-to-source voltages (Vds) are larger than the Vds saturation voltage. Thus, the design targets current 74 to equal approximately the sum of currents 70 plus 92, and targets current 81 to equal approximately the sum of currents 77 plus 97, and targets current 89 to equal approximately the sum of currents 85 plus 104. However, as will be seen further hereinafter, during operation the value of currents 74, 81, 89, 92, 97, and 104 vary in response to the operating conditions.

Referring to FIG. 3 and the operation of circuit 15, or alternately circuit 61, at a time T0 circuit 15 drives terminal 16 low, terminal 18 high, and disables drivers 27 to keep terminal 17 in a high impedance state (HiZ). Thus, input 36 is a low value, approximately Vr, and input 38 is a high value that is substantially Vm. Because drivers 27 are both disabled, terminal 17 has a high impedance (HiZ) state and input 37 receives the MB signal from motor terminal MB. The low value from input 36 enables transistor 71 which forms a voltage on node 68 that is substantially the Vgs of transistor 71. Input 38 is at substantially VM so node 83 is at a voltage of Vm plus the Vgs of transistor 86. The BEMF of motor 11 forms signal MB on terminal MB which is received on terminal 17. The received MB signal causes input 37 to have a voltage of substantially the corresponding BEMF voltage of signal MB plus Vn. Assume that in this embodiment, Vn may be substantially Vm/2. Thus, node 75 is at substantially the BEMF voltage of signal MB plus Vm/2 plus the Vgs of transistor 78. The input signals form a voltage Vp at node 64.

Assuming that resistors 65-67 have substantially equal resistance values, voltage Vp may be expressed as:)

$$Vp=(V36+V37+V38)/3+Vgs \qquad (1)$$

Where:
Vxx=voltage on the corresponding input terminal.
An embodiment of one of voltages V36-V38 may include the BEMF voltage from at least one of terminals MA-MC, thus an embodiment of circuit 62 may be configured to form Vp to vary responsively to variations of the received BEMF voltage or alternately to have a value that is representative of the received BEMF voltage. Since all the Vgs voltages are assumed to be equal, this operational condition of circuit 61 forms Vp as:

$$Vp=(Vm/2)+(VBEMF[fromMB]/3)+Vgs \qquad (2)$$

Therefore, each of currents 58, 59 and 60 may be expressed as:

$$Ix=(Vp-VNX)/R \qquad (3)$$

Where;
Ix=the one of currents 58, 59 and 60,
VNX=voltage of the corresponding node, and
R=the corresponding resistor.
For current 58, since transistor 71 is enabled, current flows from nodes 75 and 83 to node 64, and through resistor 65 as current 58. Thus, an embodiment of current 58 may be expressed as:

$$I58=(Vp-V68)/R;$$

or $$I58=((Vm/2)+(VBEMF[fromMB]/3))/R \qquad (4)$$

Current 72 through transistor 71 has a value of current 58 plus current 70. Thus, current 72 has a value that is greater than current 70. Therefore, current 92 has to decrease so that currents 72 plus 92 will be substantially equal to current 74. In order to form a lower value of current 92, the source to drain voltage (Vds) of transistor 91 has to decrease to a small value. This small source to drain voltage causes transistor 91 to pull output 41 to substantially Vc as illustrated by plot 54 in FIG. 3. An embodiment of circuit A may include that the current comparator compares current 72 at node 115 to the sum of current 74 minus current 92. If current 72 plus current 92 is greater than current 74 the comparator forces the ZA output high, and vice versa.

For circuit C, current 60 flows from node 64 through resistor 67 to node 83. As indicated by equation (3), current 60 is:

$$I60=(Vp-V83)/R, \text{which becomes:}$$

$$I60=((VBEMF[fromMB]/3)-(Vm/2))/R$$

Since VBEMF/3 is smaller than Vm/2, current 60 is negative so that current 87 is less than current 85. Thus, transistor 88 forms current 89 at a value low enough for currents 87 and 104 to sum to current 89. In order to decrease current 89, the source to drain voltage of transistor 88 has to decrease. Thus, transistor 88 pulls output 43 low to substantially the value of Vr, as illustrated by plot 56. An embodiment of circuit C may be configured to include that the current comparator compares current 87 at node 117 to the sum of current 89 minus current 104. If current 87 plus current 104 is less than current 89 the comparator forces the ZC output low, and vice versa.

Between time T0-T2, circuit B receives the MB signal from terminal MB. At time T0, the BEMF from MB causes input 37 to be substantially the BEMF voltage from MB plus Vn or alternately the BEMF voltage from MB plus Vm/2. Thus, the operation explained for circuit C also applies to circuit B at time T0. Circuit B forms current 59 to be substantially:

$$I59=(Vp-V75)/R, \text{which becomes}$$

$$I59=-(2(VBEMF[fromMB])/3R).$$

Even though there is a BEMF voltage included in signal MB, current 59 is negative and current 79 is less than current 77 (similar to current 87 except that currents 59 and 79 include the BEMF voltage). From time T0 to just before T1, circuit B forms current 81 at a low value so that currents 79 plus 97 sum to current 81. In order to form the small value of current 81, the Vds of transistor 80 has to be small which causes transistor 80 to pull output ZB to substantially Vr as illustrated by plot 55. Therefore, circuit B forms signal ZB as a low value (similar to circuit C). Between time T0 and time T1, the BEMF from motor 11 decreases and causes the MB signal and input 37 to decrease in value. As the value of input 37 decreases, current 59 increases. It can be seen that an embodiment of circuit B may be configured to form currents 59 and 79 to be representative of the BEMF voltage received from signal MB on input 37. As the BEMF voltage increases (or alternately decreases), current 59 decreases (or alternately increases) and current 79 increases (or alternately decreases. At time T1, the BEMF voltage of signal MB has become substantially zero thus input 37 has decreased to a value of approximately Vm/2, as illustrated by a point 51 on plot 50. Thus, current 59 increases to substantially zero causing current 79 to become substantially current 77 in response to the BEMF of signal MB reaching substantially the zero-crossing of the BEMF voltage.

Prior to time T1, current 81 had a low value because current 79 had a small value. Since current 79 has increased in value, current 97 has to decrease so that the sum of currents 79 and 97 will equal to current 81. In order to form a lower value of current 97, the source to drain voltage (Vds) of transistor 96 decreases so that current 97 will decrease. This small source to drain voltage causes transistor 96 to pull output 42 to substantially Vc as illustrated by plot 55 at time T1. An embodiment of the current comparator of circuit B may be configured to have a high output impedance. Consequently, a small change between currents 97 and 81 causes the ZB signal to quickly change state. Thus, output 42 transitions, for example from low to high, in response to circuit B detecting the substantially zero-crossing of the BEMF of the motor winding corresponding to terminal MB. An embodiment may include that circuit B is configured to detect substantially the mid-point value of the MB signal and responsively form a transition the of ZB signal.

An embodiment of circuit B may be configured to include a current comparator that compares current 79 at node 116 to the sum of current 81 minus current 97. If current 79 plus current 97 are less than current 81 the comparator forces the ZB output low, and vice versa.

An embodiment of circuit 61, or alternately circuit B, may be configured to form current 97 to change in magnitude by the same amount as a change in magnitude of current 59, but in the opposite direction. Thus, to increase in response to a decrease in current 59, and decrease in response to an increase in current 59. Similarly, an embodiment of circuit 61, or alternately circuits A or C, may be configured to form respective currents 92 or 104 to change in magnitude by the same amount as a change in magnitude of respective currents 58 or 60, but in the opposite direction. Thus, to increase in response to a decrease in respective currents 58 or 60, and decrease in response to an increase in respective currents 58 or 60.

At time T2, circuit 31 (FIG. 1) changes control signals (CA-CC) to continue rotating motor 11 by keeping SC high, driving SB low, and disabling driver 26 to form a high impedance (HiZ) state for terminal 16 as illustrated by plot 47 between times T2 and T4. Circuit B operates between times T2-T4 as explained for circuit A between times T0 to T2. Circuit C continues to operate as explained for circuit C between times T0-T2. Thus, circuit 61 forms output 42 to be substantially Vc and continues to form output 43 to be substantially Vr. At time T2, circuit A receives signal MA which includes the BEMF voltage from terminal MA which causes input 36 to be substantially Vr. Thus, circuit A continues to form current 72 to be larger than current 70 and circuit A keeps output 41 and signal ZA at substantially Vc.

Between time T2 and T3, the BEMF of signal MA increases and circuit A responsively begins to decrease currents 58 and 72. At time T3, the BEMF of signal MA increases to substantially the zero-crossing of the BEMF, and signal MA increases to substantially Vn or alternately to substantially Vm/2 as illustrated by point 48 of plot 47. As the value of input 36 increases, current 58 decreases. An embodiment of circuit A may be configured to form currents 58 and 72 to be representative of the BEMF voltage received on input 36 in a manner similar to that explained between times T0-T2 for current 59 responding to signal MB. As the BEMF voltage increases (or alternately decreases), currents 58 and 72 responsively decrease (or alternately increase). When the BEMF voltage from input 36 reaches substantially the zero-crossing of the BEMF voltage, input 36 reaches a value of approximately Vm/2. Current 58 becomes substantially zero, and current 72 becomes approximately current 70. As current 72 decreases, current 74 has to decrease. Thus, the source to drain voltage of transistor 73 decreases in order to decrease current 74 to a value that causes the sum of currents 72 and 92 to be substantially current 74. An embodiment may include that the Vds of transistor 91 increases so that transistor 91 forms current 92 to be closer to the target value. The change in the source to drain voltage of transistor 73 causes transistor 73 to pull output 41 to substantially Vr and cause a transition of output ZA. Consequently, circuit A causes output 41 to change states and form a transition of signal ZA in response to detecting substantially the zero-crossing of the BEMF of the MA signal as illustrated by plot 54 at time T3. Thus, an embodiment of circuit A may be configured to form current 72 to be representative of the BEMF voltage received on input 36. Between times T3 and T4 circuit A continues to keep output 41 low.

At time T4, circuit 31 (FIG. 1) changes control signals (CA-CC) to drive SA high, keep SB low, and disable driver 28 to form a high impedance (HiZ) state for terminal 18 as illustrated by plot 52 between times T4 and T6.

Between times T4-T6, circuit A operates in the same manner as explained for circuit C between times T0-T2, thus, circuit A continues to maintain output 41 at substantially Vr as illustrated by plot 54. Between times T4-T6, circuit B continues to operate as explained between times T2-T4 and continues to form output 42 at substantially Vc as illustrated by plot 55. Between times T4-T6, circuit C operates in the same manner as explained for circuit B between times T0-T2. From 14 to just before T5, circuit C receives the MC signal and the corresponding BEMF voltage from terminal MC and responsively forms output 43 at substantially Vr from T4 to just before T5. Thus, current 60 is negative and current 87 is less than current 85. Thus, transistor 88 has a small Vds and forms current 89 to be substantially equal to current 87 plus current 104, and continues to pull output 43 to substantially Vr. As the value of input 38 decreases, current 60 increases. An embodiment of circuit C may be configured to form currents 60 and 87 to be representative of the BEMF voltage received on input 38. As the BEMF voltage increases (or alternately decreases), currents 60 and 87 responsively decrease (or alternately increase).

At time T5, circuit C operates in the manner explained for circuit B at time T1. At time T5, the BEMF voltage reaches substantially the zero-crossing of the BEMF voltage. In an embodiment, input 36 becomes Vn or alternately Vm/2 and current 60 becomes substantially zero. Thus, current 87 becomes substantially current 85. The increased value of current 87 causes transistor 103 to decrease the value of current 104 by decreasing corresponding the Vds. The decreased Vds causes transistor 103 to pull output 43 to substantially Vc and form a transition of the ZC signal. Circuit C is configured to detect the substantially zero-crossing of the BEMF voltage from signal ZC and responsively form a transition of output 43. An embodiment may include that circuit C forms a transition from substantially Vr to substantially Vc at time T5. From T5 to T6, circuit C, or alternately circuit 61, continues to form output 43 at substantially Vc. Thus, circuit C is configured to detect substantially the zero-crossing of the BEMF voltage received from terminal MC, or alternately detect MC reaching substantially VM/2, and to responsively form a transition of signal ZC.

Between times T6-T8, circuit B, or alternately circuit 61, operates as explained for circuit A between times T2-T4. Thus, circuit B detects the substantially zero-crossing of the BEMF from terminal MB or alternately detects the substantially mid-point of the MB signal as illustrated by point 51, and responsively forms a transition of signal ZB at time T7 as illustrated by plot 55.

Between times T8-T10, circuit A, or alternately circuit 61, operates as explained for circuit B between times T0-T2, and detects the substantially zero-crossing of the BEMF from terminal MA or alternately detects the substantially mid-point of the MA signal as illustrated by point 48, and responsively forms a transition of signal ZA at time T9 as illustrated by plot 54.

The operation continues for other subsequent operating cycles. For example, between times T10-T12, circuit C, or alternately circuit 61, operates as explained for circuit A between times T2-T4, and detects substantially the zero-crossing of the BEMF from terminal MC or alternately detects the substantially mid-point of the MC signal as illustrated by point 53, and responsively forms a transition of signal ZC at time T11 as illustrated by plot 56.

From the foregoing explanations, one skilled in the art will appreciate that an embodiment of circuit A is configured to detect the substantially zero-crossing of the BEMF of terminal MA and to responsively form a transition of signal ZA. Similarly, an embodiment of circuits B and C are configured to detect the substantially zero-crossing of the BEMF received from respective terminals MB and MC and to responsively form a transition of respective signals ZB and ZC.

In an embodiment, circuit 61 forms currents that are representative of the MA-MC signals or alternately the BEMF of the respective motor windings. Circuit 61, or alternately circuits 15 or 35, substantially do not conduct any current from any of motor terminals MA-MC. Those skilled in the art will appreciate that inputs 36-38 may conduct some small leakage current from terminals MA-MC. For example, inputs 36-38 may conduct a gate leakage current of transistors 71, 78, and 86 from respective terminals MA-MC. However, such leakage currents are very small and much smaller that currents through the previous resistor dividers and through the previous clamp diodes. The small current into inputs 36-38 facilitates forming circuit 61, or alternately circuits 15 and 35, on a single semiconductor die.

Figure 4:
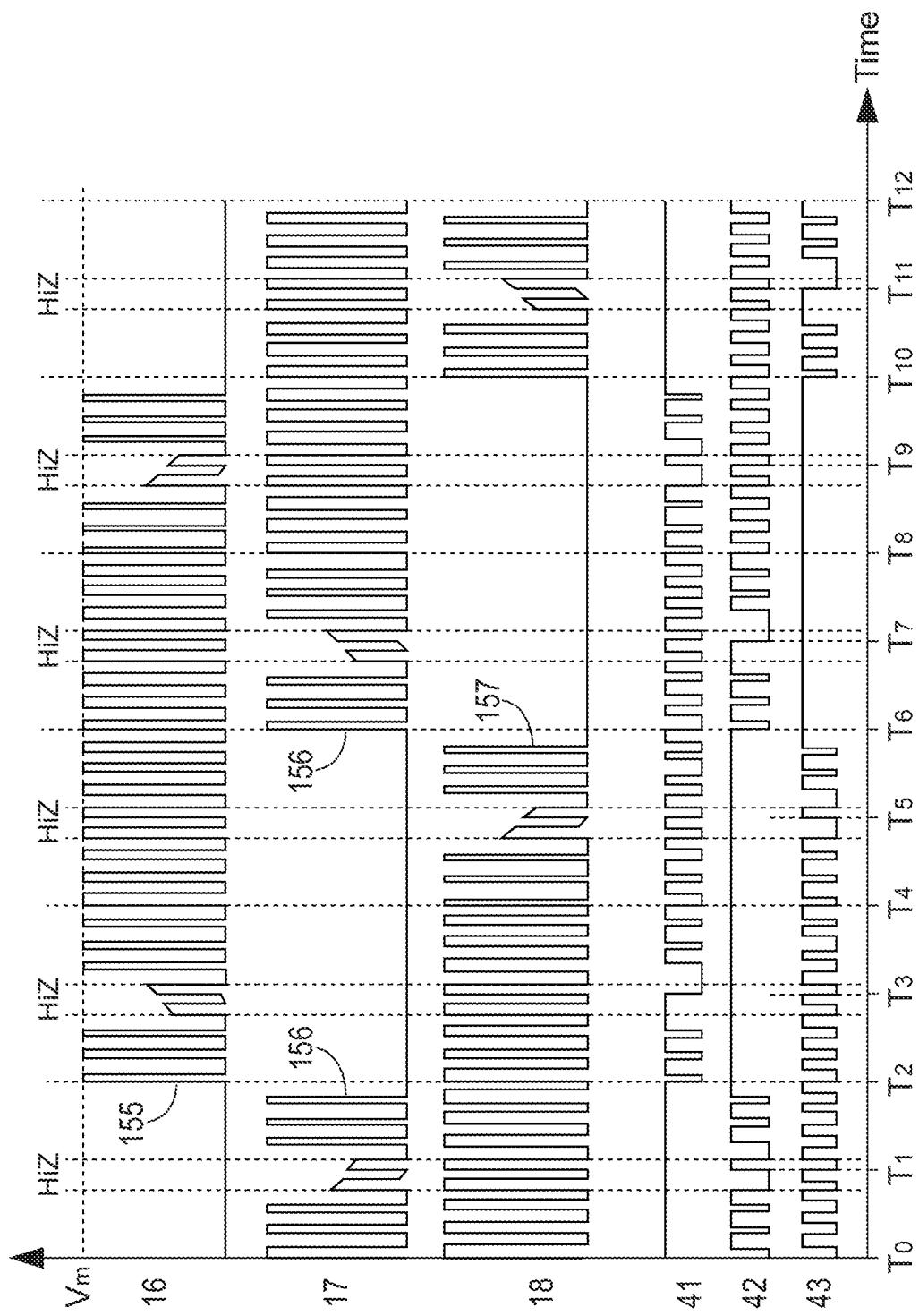
FIG. 4 is a graph having plots that illustrate some of the signals formed during an alternate operation of an embodiment of the circuit of FIG. 1 or 2 in accordance with the present invention.

FIG. 4 is a graph having plots that illustrate some of the signals formed during an alternate operation of an embodiment of circuit 15 or alternately circuit 61. The abscissa indicates time and the ordinate indicates increasing value of the illustrated signal. A plot 155 illustrates the signal on terminal 16, thus, on terminal MA and/or input 36. Plots 156 and 157 illustrate the signals on respective terminals 17 and 18 or alternately inputs 37 and 38, thus, on respective terminals MB and MC. A plot 158 illustrates output signal ZA. Plots 159 and 160 illustrate respective output signals ZB and ZC. This description has a references to FIGS. 1-2 and 4.

Those skilled in the art will appreciate that during the operation of motor 11, the motor terminals may be pulsed using PWM operation. Simplified examples of an embodiment of PWM operation are illustrated in FIG. 4 between times T0-T12.

During some PWM operations, one terminal may be held at a substantially constant value, while one or alternately both of the other two are pulsed. For example, between times T0 to T2, terminal 16 is held low, and terminals 17 and 18 are pulsed. For a portion of interval T0-T2, one of the terminals being pulsed may transition to the HiZ state, and the other terminal continues to be pulsed. For example, near T1, terminal 18 continues to the pulsed while terminal 17 is placed in the HiZ state so that terminal 17 receives the MB signal along with the associated BEMF from terminal MB. During this HiZ interval, the signal received from motor 11, such as the MB signal on terminal 17, includes a PWM ON condition and a PWM OFF condition. During the PWM ON condition, terminal 18 is driven high, to substantially Vm, and during the PWM OFF condition terminal 18 is driven low to substantially Vr. This induces similar transitions on the MB signal. Thus, during the PWM ON condition, signal MB may have a value of the BEMF voltage plus Vm/2, and during the PWM OFF condition may have a value of the BEMF voltage plus Vr or alternately plus substantially zero. However, circuit 35 or alternately circuit 61 still detects the substantially zero-crossing of the BEMF during the PWN ON condition as illustrated by plot 55 having a low to high transition just after T1.

For time interval T2 to 14, terminal 17 is driven low, and terminal 18 pulsed. Terminal 16 is pulsed for a portion of the interval and driven to a HiZ condition for another portion of the interval, for example just before and just after T3. Thus, during the PWM ON condition, signal MA may have a value of the BEMF voltage plus Vn or alternately plus Vm/2, and during the PWM OFF condition to have a value of the BEMF voltage plus Vr or alternately plus substantially zero. However, circuit 35 or alternately circuit 61 still detects the substantially zero-crossing of the BEMF voltage during the PWN ON condition as illustrated by plot 54 having a high to low transition just after T3. This also applies to the other time intervals for the other terminals.

Thus, one skilled in the art will understand that circuit 61, or alternately circuits A-C, are configured to detect the substantially zero-crossing of the BEMF even when motor 11 is driven in a PWM operational mode.

Those skilled in the art will appreciate that circuit 61 or alternately circuit 31 may contain logic circuits or other types of circuits to only pass the one of signals ZA-ZC that corresponds to the one of terminals 16-18 that has the HiZ state for that particular cycle. For example, circuit 61 may have logic circuits that only pass signal ZC during the portion of the cycle from T4-T6 that terminal 18 has the HiZ condition, and only pass the ZB signal for the portion of the cycle from T6-T8 that terminal 17 has the HiZ condition. Those skilled in the art will also appreciate that various types of logic circuits may be used to facilitate this type of operation. For some operating conditions, circuit 15 (FIG. 1) may allow motor 11 to free-run. In the free-run condition, circuit 15 does not drive terminals 16-18, thus MA-MC, and drivers 26-28 are in the HiZ condition. However, circuit does receive the MA-MC signals from motor 11. During the free-run operation, the value of Vn may be changing and at any instant may a value anywhere between Vm and Vr, inclusively. However, circuit 61 continues to operate as described and detects the substantially zero-crossing of the BEMF voltage from any of signals MA-MC.

Figure 5:
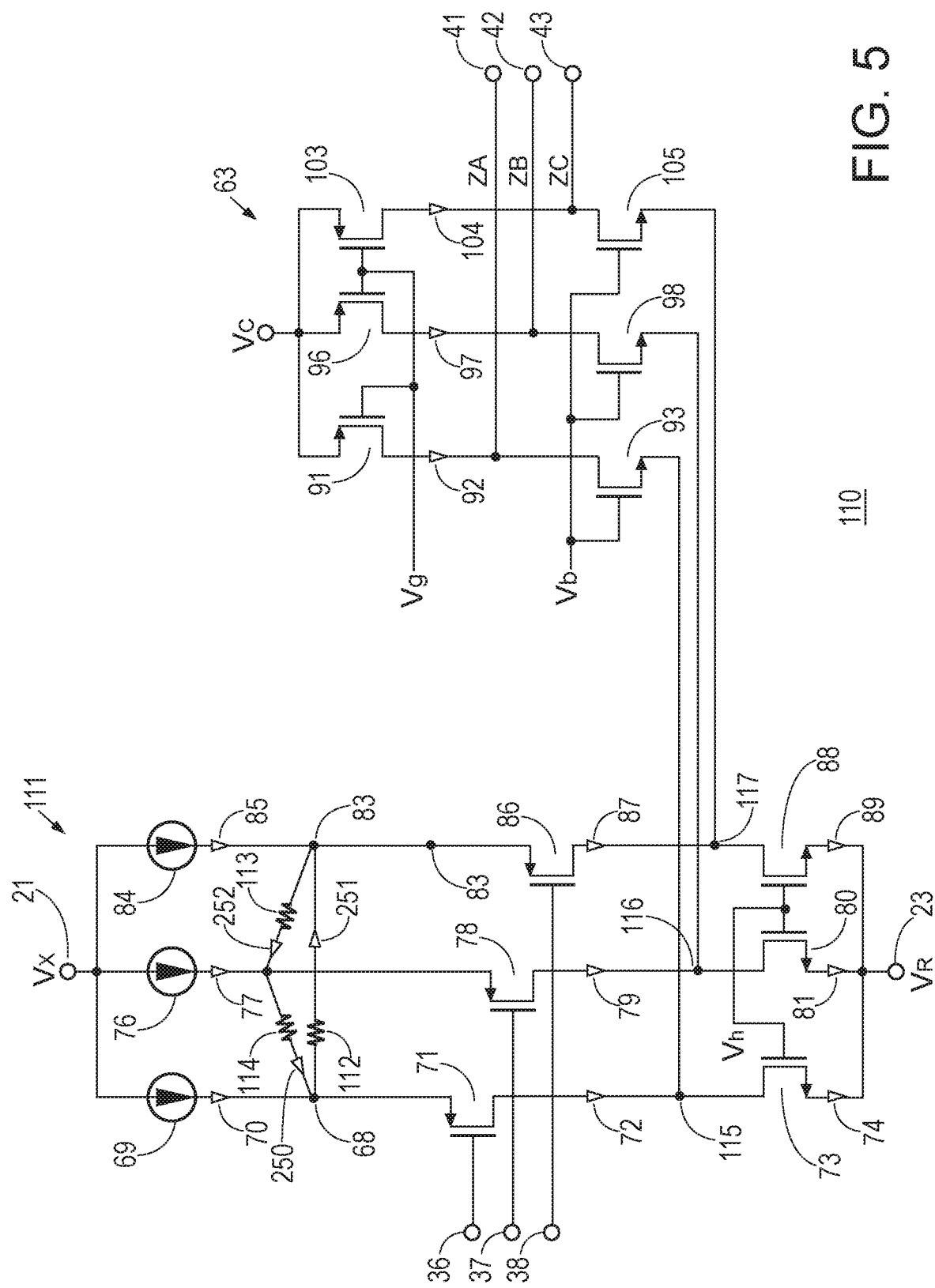
FIG. 5 schematically illustrates an example of a portion of an embodiment of a sense circuit that may have an embodiment that may be an alternate embodiment of the circuit of FIG. 2 in accordance with the present invention.

FIG. 5 schematically illustrates an example of a portion of an embodiment of a sense circuit 110 that may have an embodiment that may be an alternate embodiment of circuit 61 in FIG. 2. Circuit 110 is substantially the same as circuit 61 except that resistors 65-67 of circuit 61 are omitted and are replaced by resistors 112-114. Thus, circuit 110 has an input circuit 111 instead of circuit 62. Resistors 112-114 are connected in a delta configuration instead of the "Y" configuration of resistors 65-67.

Although a delta configuration is used for resistors 112-114, currents 72, 79, and 87 are still formed to be representative of the representative BEMF voltage as explained for circuit 61. For example, as compared to the conditions for equation (4), the currents may be represented as:

$$I72=I70+((3*Vm/2)+VBEMF[MB])/R,$$

$$I79=I77-(2VBEMF[MB]/R), \text{ and}$$

$$I87=I85+(VBEMF[MB]-(3Vm/3))/R.$$

Where:
Resistors 112-114 have substantially equal values that are represented by R,
I70= is current 70,
I77= is current 77, and
I87= is current 87.

Consequently, circuit 110 detects the substantially zero-crossing of the BEMF voltage from terminals MA-MB and the corresponding output signal ZA-ZC identifies the detection of the substantially zero-crossing.

Thus, one end of the resistors 112 and 114 are connected to node 68. A second end of resistor 114 is connected to node 75 along with one end of resistor 113. A second end of resistor 113 and a second end of resistor 112 are connected to node 83. Those skilled in the art will appreciate that circuit 110 does not have a node 64 and does not form voltage Vp. However, except for not forming Vp and corresponding currents 58, 59, and 60, circuit 110 functions substantially identically to circuit 61.

From all the foregoing, for one skilled in the art will appreciate that input 36 is connected to the gate of transistor 71. A source of transistor 71 is commonly connected to a first terminal of resistor 65, node 68, and a first terminal of current source 69. Current source 69 has a second terminal commonly connected to input 21, a first terminal of current source 76, and a first terminal of current source 84. A second terminal of current source 84 is commonly connected to node 83, a first terminal of resistor 67, and a source of transistor 86. A gate of transistor 86 is connected to input 38. A drain of transistor 86 is commonly connected to node 117, a drain of transistor 88, and to a source of transistor 105. A drain of transistor 105 is commonly connected to output 43 and a drain of transistor 103. A source of transistor 103 is commonly connected to terminal 22, a source of transistor 96, and a source of transistor 91. A drain of transistor 91 is commonly connected to output 41 and a drain of transistor 93. A source of transistor 93 is commonly connected to node 115, a drain of transistor 73, and a drain of transistor 71. A source of transistor 73 is commonly connected to terminal 23, a source of transistor 88, and a source of transistor 80. Transistor 80 has a drain commonly connected to node 116, a drain of transistor 78, and a source of transistor 98. A drain of transistor 98 is commonly connected to output 42 and a drain of transistor 96. A gate of transistor 98 is commonly connected to a gate of transistor 105, a gate of transistor 93, and connected to receive a bias voltage Vb. Transistors 78 has a gate connected to input 37. A source of transistor 78 is commonly connected to node 75, a second terminal of current source 76, and to a first terminal of resistor 66. A second terminal of resistor 66 is commonly connected to node 64, a second terminal of resistor 67, and a second terminal of resistor 65.

Figure 6:
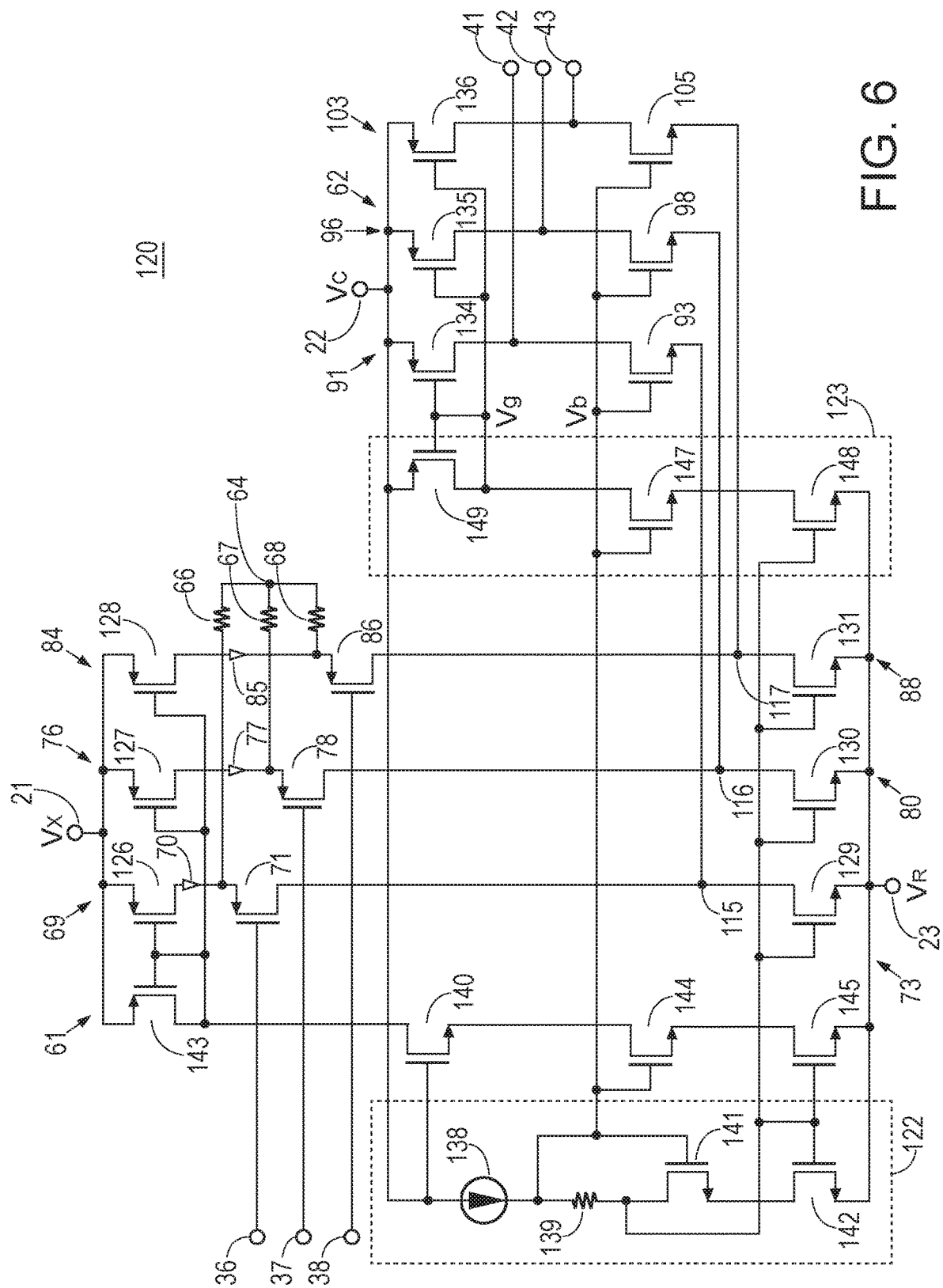
FIG. 6 schematically illustrates an example of a portion of an embodiment of a sense circuit that may have an embodiment that may be an alternate embodiments of any of the circuits of FIG. 1, 2, or 5 in accordance with the present invention.

FIG. 6 schematically illustrates an example of a portion of an embodiment of a sense circuit 120 that may have an embodiment that may be an alternate embodiments of any of circuits 35, 61, or 110. Circuit 120 includes a bias generation circuit 122. Circuit 122 includes a current source 138, a resistor 139, and transistors 141 and 142. A current source 138 facilitates establishing bias voltage Vb. Transistors 141 and 144 are connected in a current mirror configuration to form a bias current to assist in biasing transistors 93, 98, and 105. Transistors 142, 145, and 129-131 are connected in a current mirror configuration to establish a bias current for respective transistors 73, 80, and 88 (FIG. 2.) Transistors 143 and 126-128 are connected in a current mirror configuration to establish a bias current for respective current sources 69, 76, and 84.

Current sources 69, 76, and 84 of circuit 61 (FIG. 2) are formed by transistors 126, 127, and 128. Transistor 143 of the current mirror circuit is connected to transistors 140, 144, and 145 to control the current through transistor 143.

Transistors 73, 80, and 88 of circuit 61 (FIG. 2) are formed by transistors 129, 130, and 131 connected in the current mirror configuration with transistors 142 and 145.

Transistors 91, 96, and 103 of circuit 61 (FIG. 2) are formed by transistors 134, 135, and 136 connected in the current mirror configuration with transistor 149. Transistors 149, and 147 control the current for transistor 149. An embodiment of circuit 120 may be configured to operate substantially the same as circuit 61. In an embodiment, transistors 73, 80, 88, 91, 96, and 103 function as current sources by may not always function as an ideal current source. Thus, the transistors may be trimmed to provide the selected target value.

From the foregoing, one skilled in the art will appreciate that current source 138 has a first terminal commonly connected to a gate of transistor 140 and to terminal 22. A second terminal of current source 138 is commonly connected to a first terminal of resistor 139, a gate of transistor 141, a gate of transistor 144, a gate of transistor 147, a gate of transistor 93, a gate of transistor 98, and a gate of transistor 105. Transistor 141 has a drain commonly connected to a second terminal of resistor 139, a gate of transistor 142, a gate of transistor 145, a gate of transistor 129, a gate of transistor 130, a gate of transistor 131, and a gate of transistor 148. Transistor 141 has a source connected to the drain of transistor 142. A source of transistor 142 is commonly connected to a source of transistor 145, a source of transistor 129, terminal 23, a source of transistor 130, a source of transistor 131, and a source of transistor 148.

Transistor 145 has a drain connected to a source of transistor 144. A drain of transistor 144 is connected to a source of transistor 140. A drain of transistor 140 is commonly connected to a drain of transistor 143, a gate of transistor 143, a gate of transistor 126, a gate of transistor 127, and a gate of transistor 128. A source of transistor 128 is commonly connected to a source of transistor 127, input 21, a source of transistor 126, and a source of transistor 143. Transistor 128 has a drain connected to the source of transistor 86. Transistor 127 as a drain connected to the source of transistor 78, and transistor 126 as a drain connected to the source of transistor 71. Transistor 129 has a drain connected to node 115. Transistor 130 has a drain connected to node 116, and transistor 131 has a drain connected to node 117. Transistor 148 has a drain connected to a source of transistor 147. A drain of transistor 147 is commonly connected to a drain of transistor 149, a gate of transistor 149, a gate of transistor 134, a gate of transistor 135, and a gate of transistor 136. A source of transistor 136 is commonly connected to a source of transistor 135, terminal 22, a source of transistor 134, and a source of transistor 149.

Figure 7:
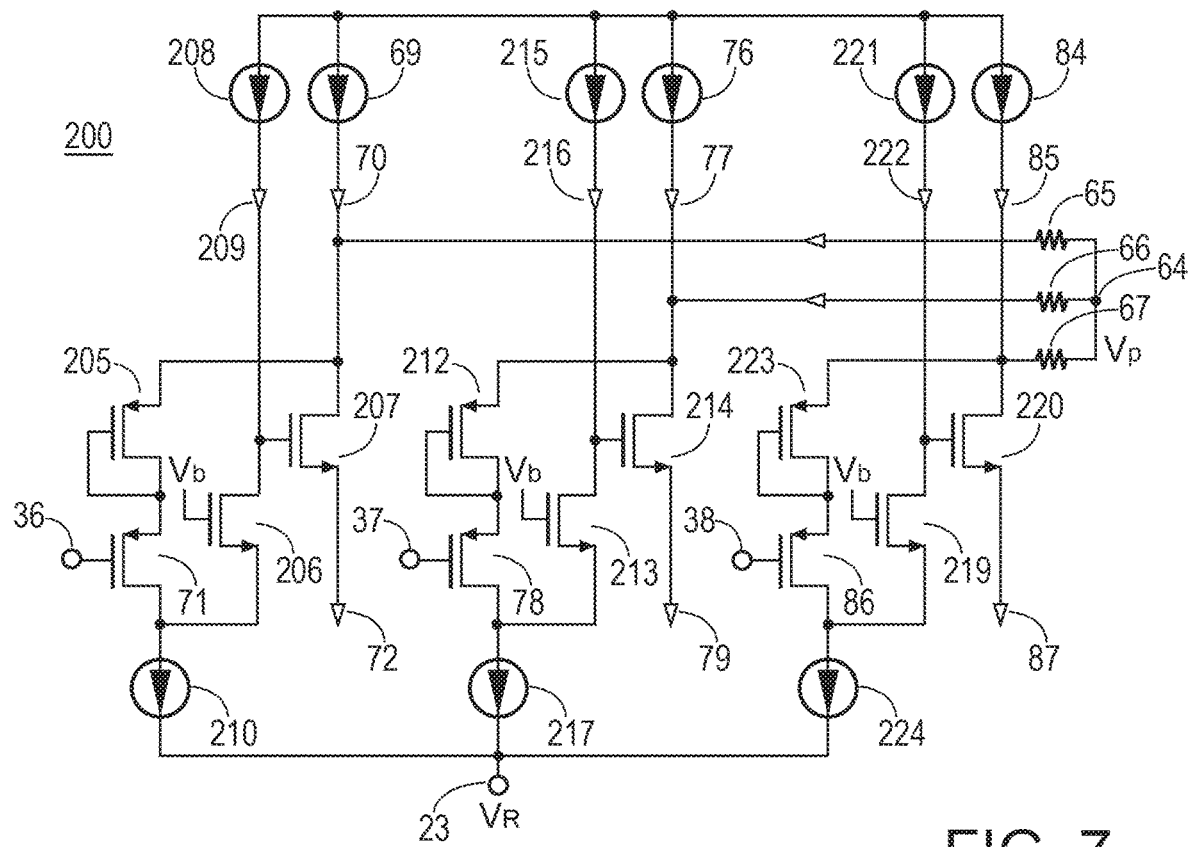
FIG. 7 schematically illustrates an example of a portion of an embodiment of an input circuit that may have an embodiment that may be an alternate embodiment of at least a portion of any of the circuits of FIG. 1, 2, or 5-6 in accordance with the present invention.

FIG. 7 schematically illustrates an example of a portion of an embodiment of an input circuit 200 that may have an embodiment that may be an alternate embodiment of any of circuits of circuits 62 (FIG. 2) or 111 (FIG. 5), or alternately an input circuit of circuit 120.

Circuit 200 is an example an embodiment of a circuit that may be used to shift the level of the MA-MC signal that is received from motor 11 to form a different signal on nodes 68, 75, and 83. For example, the voltage of the MA-MC signals received on inputs 36, 37, and 38 forms signals on nodes that are shifted by the level of two gate-to-source voltages (Vgs). Thus, the respective nodes may be expressed as:

$$V68 = V36 + 2*Vgs,$$

$$V75 = V37 + 2*Vgs, \text{ and}$$

$$V83 = V38 + 2*Vgs.$$

Shifting the level of the node voltages may assist in providing a larger operating voltage margin to the respective output circuit. In other embodiments, the amount of the level shift may be decreased by removing transistors 205, 212, and 223 or alternately by one can increase the shift amount by adding more PMOS transistors between transistors 71 and 205, and between transistors 78 and 212, and between transistors 86 and 223.

Circuit 200 may also form a more accurate level shift by forming substantially the same amount of current through transistors 71, 78, and 86.

Figure 8:
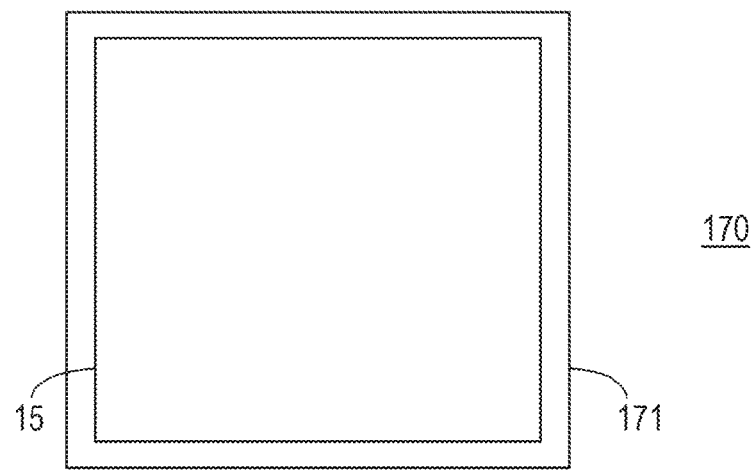
FIG. 8 illustrates an enlarged plan view of a semiconductor device that includes at least a portion the circuit of FIG. 1 or alternately of FIG. 2 or 5-6 in accordance with the present invention.

FIG. 8 illustrates an enlarged plan view of an example of an embodiment of a portion of a semiconductor device or integrated circuit 170 that is formed on a semiconductor die 171. In an embodiment, any one of circuits 15, 61, 110, and/or 120 may be formed on die 171. Die 171 may also include other circuits that are not shown in FIG. 7 for simplicity of the drawing. The circuits and device or integrated circuit 170 may be formed on die 171 by semiconductor manufacturing techniques that are well known to those skilled in the art.

From all the foregoing, one skilled in the art will appreciate that an example of an embodiment of a circuit for controlling a motor may comprise:

a first circuit having a first transistor, such as for example transistor 71, configured to receive a first voltage, such as for example signal MA, that is representative of a first motor winding voltage, the first transistor configured to conduct a first sense current, such as for example current 72, that is representative of a first BEMF voltage of the first voltage;

a first current comparator circuit, such as for example circuit A, having a first current source transistor, such as for example transistor 73, configured to form a first portion, such as for example current 74, of a first reference current and having a second current source transistor, such as for example transistor 91, configured to form a second portion, such as for example current 92, of the first reference current; and the first current comparator circuit configured to compare the first sense current to a difference between the first and second portions of the first reference current, the first current comparator configured to form a first output signal, such as for example signal ZA, and to change the first output signal in response to detecting the first sense current changing to a first value greater than the first reference current and in response to detecting the first sense current changing to a second value that is less than the first reference current.

An embodiment of the circuit may also include a second circuit, such as for example circuit B, configured to receive a second voltage, such as for example signal MB, that is representative of a second motor winding voltage, and including a third circuit, such as for example circuit C, configured to receive a third voltage, such as for example signal MC, that is representative of a third motor winding voltage, the motor control circuit configured to form a fourth voltage, such as for example voltage Vp, that is representative of a sum of the first voltage, the second voltage, and the third voltage.

An embodiment may also include a first resistor coupled to receive the fourth voltage and form a first resistor current, such as for example current 58, that is representative of the first BEMF voltage, the first transistor coupled to receive the first resistor current.

In an embodiment, the first transistor may be configured to conduct the first resistor current as a portion of the first sense current.

An embodiment may also include a first current source, such as for example current source 69, that forms a first source current, such as for example current 70, wherein the first transistor conducts the first source current and the first resistor current.

An embodiment of the motor control circuit may be configured to form the first resistor current to be substantially zero in response to a substantially zero-crossing of the first BEMF voltage.

An embodiment of the first current source transistor may be configured to conduct the first sense current and the second portion of the first reference current to form the first portion of the first reference current.

In an embodiment, first current comparator circuit may be configured to change the first output signal in response to detecting a substantially zero-crossing of the first BEMF voltage.

In an embodiment, a first current carrying electrode, such as for example a drain, of the first transistor may be commonly coupled to a first current carrying electrode, such as for example a drain, of the first current source transistor, to a first current carrying electrode, such as for example a drain, of the second current source transistor, and to form the first output signal.

An embodiment of the circuit may also include a second current comparator circuit, such as for example circuit B, configured to receive a second voltage, such as for example signal MB, that is representative of a second motor winding voltage and to form a second sense current, such as for example current 79, that is representative of a second BEMF voltage of the second voltage wherein the second current comparator circuit may be configured to form a second output signal, such as for example signal ZB, and to change the second output signal in response to detecting a substantially zero-crossing of the second BEMF voltage.

Those skilled in the art will appreciate that an example of an embodiment of a semiconductor device having a motor control circuit may comprise:

a first current circuit, such as for example circuit A, configured to receive a first signal from a motor, such as for example signal MA, wherein the first signal includes a first BEMF voltage, the first current circuit configured to form a first sense current, such as for example current 72, that is representative of the first BEMF voltage;

a first current reference circuit, such as for example one or more of node 115 and/or transistor 73, configured to form a first reference current, such as for example current 74-current 92; and a first current comparator circuit, such as for example transistor 91 and other portions of node 115 and/or transistor 73, configured to compare the first sense current to the first reference current and detect the first sense current changing to a value that is representative of a substantially zero-crossing of the first BEMF voltage, the first current comparator circuit configured to form a transition of a first output signal, such as for example signal ZA, responsively to detecting the substantially zero-crossing.

An embodiment of the semiconductor device of may also include a second current circuit, such as for example circuit B, configured to receive a second signal including a second BEMF voltage from the motor, such as for example signal MB, and form a second sense current, such as for example current 79, that is representative of the second BEMF voltage; and a second current comparator circuit configured to detect the second sense current changing to a value that is representative of a substantially zero-crossing of the second BEMF voltage and to responsive form a transition of a second output signal, such as for example signal ZB.

In an embodiment, the semiconductor device may also include a third current circuit, such as for example circuit C, configured to receive a third signal including a third BEMF voltage from the motor, such as for example signal MC, and form a third sense current, such as for example current 87, that is representative of the third BEMF voltage; and a third current comparator circuit configured to detect the third sense current changing to a value that is representative of a substantially zero-crossing of the third BEMF voltage and to responsive form a transition of a third output signal, such as for example signal ZB.

An embodiment of the first current circuit may include a first sense transistor, such as for example transistor 71, configured to receive the first signal and responsively form the first sense current.

Another embodiment may also include a first current source transistor, such as for example transistor 73, configured receive the first sense current and the first reference current, the first current source transistor configured to form a negative transition of the first output signal.

In an embodiment, the semiconductor device may include a second current source transistor, such as for example transistor 91, configured to form at least a portion of the first reference current, the second current source transistor configured to form a positive transition of the first output signal.

Those skilled in the art will appreciate that an example of an embodiment of a method of forming a semiconductor device having a motor control circuit may comprise:

configuring an input circuit, such as for example a portion of circuits 62, to receive a signal, such as for example signal MA, from a motor wherein the signal includes a BEMF voltage, the input circuit configured to form a sense current, such as for example current 72, that is representative of at least the BEMF voltage; and configuring an output circuit, such as for example a portion of circuit 63, to detect the sense current having a first value that is representative of a substantially zero-crossing of the BEMF voltage, and to change a state of an output signal, such as for example signal ZA, in response to detecting the substantially zero-crossing.

An embodiment of the method of claim may also include configuring the input circuit to not receive the signal from a resistor divider circuit.

In an embodiment, the method may include configuring a transistor of the input circuit to receive the signal on a control electrode of the transistor.

An embodiment may also include configuring the output circuit as a current comparator that compares the sense current to a reference circuit to detect the substantially zero-crossing of the BEMF voltage.

In view of all of the foregoing, it is evident that a novel device and method is disclosed. Included, among other features, is forming a motor control circuit to sense the BEMF of a motor using a current mode circuit. An embodiment of the current mode circuit forms a current that is representative of the BEMF from the motor and detects substantially the mid-point of the BEMF. The current circuit has a high input impedance, thus, the current circuit substantially does not conduct current from the motor. The high input impedance may also reduce errors caused by IR drops within the motor. Using currents to detect the BEMF facilitates sensing the BEMF without resistor dividers and without using clamping diodes. Additionally, substantially not conducting current from the motor windings allows the current mode circuit to be formed on a semiconductor die, and also reduces power dissipation. The current mode circuit is smaller than prior voltage mode circuits, thus, the current mode circuit is smaller and can more easily fit onto a semiconductor die. Forming the current mode circuit on the semiconductor die also reduces external components which saves costs.

While the subject matter of the descriptions is described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. As will be appreciated by those skilled in the art, the example forms of circuits 62 and 63 are used as a vehicle to explain the operation method of using current to represent the BEMF, to sense the BEMF, and to detect the zero-crossing instead of sensing values of the voltage from the motor. Those skilled in the appreciate that other configurations of circuits 62 and/or 63 may be used to form the current that is representative of the BEMF and to detect the zero-crossing of the motor winding current, as long as the circuit forms a current that is representative of the BEMF.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A circuit for controlling a motor comprising:
a first circuit having a first transistor configured to receive a first voltage that is representative of a first motor winding voltage, the first transistor configured to conduct a first sense current that is representative of a first BEMF voltage of the first voltage;
a first current comparator circuit having a first current source transistor configured to form a first portion of a first reference current and having a second current source transistor configured to form a second portion of the first reference current; and
the first current comparator circuit configured to compare the first sense current to a difference between the first and second portions of the first reference current, the first current comparator circuit configured to form a first output signal and to change the first output signal in response to detecting the first sense current changing to a first value greater than the first reference current and in response to detecting the first sense current changing to a second value that is less than the first reference current.

2. The circuit of claim 1 further including a second circuit configured to receive a second voltage that is representative of a second motor winding voltage, and including a third circuit configured to receive a third voltage that is representative of a third motor winding voltage, the motor control circuit configured to form a fourth voltage that is representative of a sum of the first voltage, the second voltage, and the third voltage.

3. The circuit of claim 2 further including a first resistor coupled to receive the fourth voltage and form a first resistor current that is representative of the first BEMF voltage, the first transistor coupled to receive the first resistor current.

4. The circuit of claim 3 wherein the first transistor conducts the first resistor current as a portion of the first sense current.

5. The circuit of claim 3 further including a first current source that forms a first source current wherein the first transistor conducts the first source current and the first resistor current.

6. The circuit of claim 3 wherein the motor control circuit forms the first resistor current to be substantially zero in response to a substantially zero-crossing of the first BEMF voltage.

7. The circuit of claim 1 wherein the first current source transistor is configured to conduct the first sense current and the second portion of the first reference current to form the first portion of the first reference current.

8. The circuit of claim 1 wherein first current comparator circuit is configured to change the first output signal in response to detecting a substantially zero-crossing of the first BEMF voltage.

9. The circuit of claim 1 wherein a first current carrying electrode of the first transistor is commonly coupled to a first current carrying electrode of the first current source transistor, to a first current carrying electrode of the second current source transistor, and to form the first output signal.

10. The circuit of claim 1 further including a second current comparator circuit configured to receive a second voltage that is representative of a second motor winding voltage and to form a second sense current that is representative of a second BEMF voltage of the second voltage wherein the second current comparator circuit is configured to form a second output signal and to change the second output signal in response to detecting a substantially zero-crossing of the second BEMF voltage.

11. A semiconductor device having a motor control circuit comprising:
a first current circuit configured to receive a first signal from a motor wherein the first signal includes a first BEMF voltage, the first current circuit configured to form a first sense current that is representative of the first BEMF voltage;
a first current reference circuit configured to form a first reference current; and
a first current comparator circuit configured to compare the first sense current to the first reference current and detect the first sense current changing to a value that is representative of a substantially zero-crossing of the first BEMF voltage, the first current comparator circuit configured to form a transition of a first output signal responsively to detecting the substantially zero-crossing.

12. The semiconductor device of claim 11 further including a second current circuit configured to receive a second signal including a second BEMF voltage from the motor and form a second sense current that is representative of the second BEMF voltage; and
a second current comparator circuit configured to detect the second sense current changing to a value that is representative of a substantially zero-crossing of the second BEMF voltage and to responsive form a transition of a second output signal.

13. The semiconductor device of claim 12 further including a third current circuit configured to receive a third signal including a third BEMF voltage from the motor and form a third sense current that is representative of the third BEMF voltage; and
a third current comparator circuit configured to detect the third sense current changing to a value that is representative of a substantially zero-crossing of the third BEMF voltage and to responsive form a transition of a third output signal.

14. The semiconductor device of claim 11 wherein the first current circuit includes a first sense transistor configured to receive the first signal and responsively form the first sense current.

15. The semiconductor device of claim 11 wherein the first current comparator circuit includes a first current source transistor configured receive the first sense current and the first reference current, the first current source transistor configured to form a negative transition of the first output signal.

16. The semiconductor device of claim 15 wherein the first current comparator circuit includes a second current source transistor configured to form at least a portion of the first reference current, the second current source transistor configured to form a positive transition of the first output signal.

17. A method of forming a semiconductor device having a motor control circuit comprising:
configuring an input circuit to receive a signal from a motor wherein the signal includes a BEMF voltage, the input circuit configured to form a sense current that is representative of at least the BEMF voltage; and configuring an output circuit to form a reference current and to use the reference current to detect the sense current having a first value that is representative of a substantially zero-crossing of the BEMF voltage, and to change a state of an output signal in response to detecting the substantially zero-crossing.

18. The method of claim 17 including configuring the input circuit to not receive the signal from a resistor divider circuit.

19. The method of claim 17 including configuring a transistor of the input circuit to receive the signal on a control electrode of the transistor.

20. The method of claim 17 including configuring the output circuit to compare the sense current to the reference current to detect the substantially zero-crossing of the BEMF voltage.

* * * * *